Dec. 4, 1934.  G. SMITH  1,983,406
CALK
Filed March 24, 1934
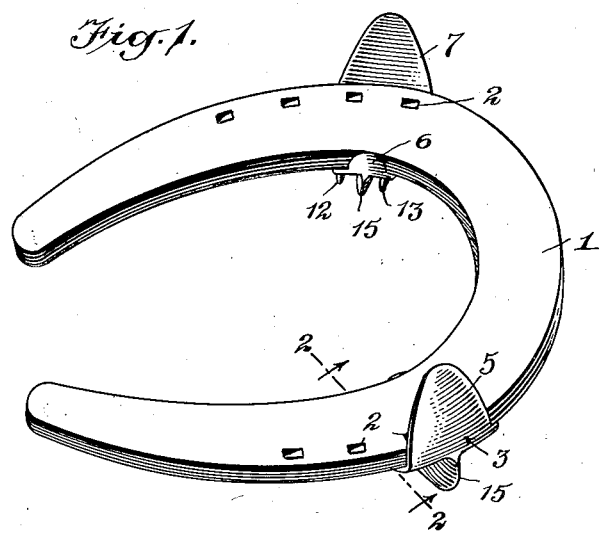
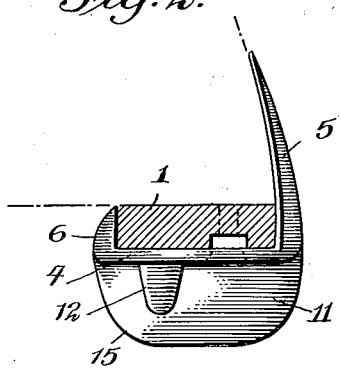
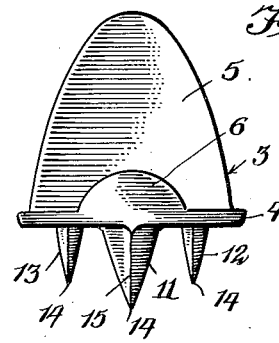
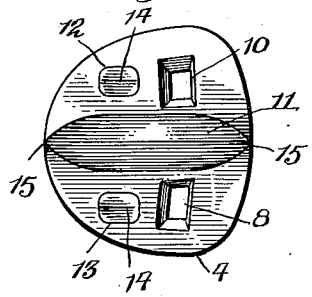
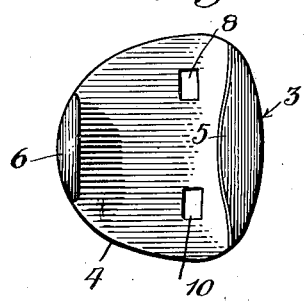
WITNESSES
INVENTOR
George Smith
BY
Munn, Anderson, Stanley, Foster & Reddy
ATTORNEYS Patented Dec. 4, 1934

1,983,406

UNITED STATES PATENT OFFICE 1,983,406

CALK

George Smith, New York, N. Y.

Application March 24, 1934, Serial No. 717,225

3 Claims. (Cl. 168—31)

This invention relates to horseshoe calks and has for an object to provide an improved construction which is an improvement over my prior United States Patent No. 1,236,494.

Another object of the present invention is to provide a calk for horseshoes which will continually present one or more sharp edges so as to prevent slipping on slippery pavements or on ice.

A further object of the invention is to provide a calk for horseshoes wherein the same may be readily applied at any time, and also wherein a plurality of depending lugs or teeth are provided and formed to come successively into operation.

In the accompanying drawing—

Figure 1 is a perspective view of a horseshoe with a pair of calks embodying the invention shown applied thereto;

Figure 2 is a sectional view through Figure 1 approximately on the line 2—2;

Figure 3 is a rear elevation of the calk shown in Figure 2;

Figure 4 is a bottom plan view of the calk shown in Figure 3;

Figure 5 is a top plan view of the calk shown in Figure 3.

Referring to the accompanying drawing by numerals, 1 indicates a horseshoe of any desired kind having a number of nail holes 2 which are also of the usual kind. The horseshoe 1 is adapted to be nailed to the hoof of the horse to protect the foot and prevent spreading of the hoof. This form of horseshoe is desirable on dirt or other soft roads, but where the roads or other surfaces over which the horse travels are slippery or covered with ice more or less, some form of protuberance must be provided as, for instance, calks of some desired kind.

In calks as heretofore made the structure operates efficiently when new, but after a certain length of time the calk becomes worn and, consequently, are flattened more or less so that they will not bite into the ground or into ice. In the present invention an improved calk has been provided which will bite into ice or slippery places when new and also when old. The structure is such that as the lugs or teeth wear down, new sharp edges are presented for engaging the ice or slippery spots to prevent slipping.

As illustrated in Figure 3 a calk 3 is provided with what may be termed a body 4, an outside or front flange 5, and an inside or rear flange 6, the outside flange being of much greater height than the inside flange. It will be understood that the calks 3 and 7 are of identical construction so that a description of one will apply to both.

The flange 5 is adapted to fit over part of the hoof and also over the outside edge of the horseshoe 1, while the inside or rear flange 6 fits only over the inside of the horseshoe, as illustrated particularly in Figure 2. The body 4 is provided with a pair of nail-receiving apertures 8 and 9, said apertures being placed the same distance apart as the apertures 2, so that two of the nails which hold the horseshoe 1 in place will also hold the calk in position both to the horseshoe and to the horse's hoof. The body 4 in addition to the apertures 8 and 9 is formed with a central tooth or lug 11 and side teeth or lugs 12 and 13. These lugs as shown in Figures 2 to 4, inclusive, are all formed with sharp outer edges 14 and with front and rear edges 15 formed in the same manner.

The central tooth 11 is much thicker and also higher than the other teeth, so that when the calk is in use the teeth 12 and 13 perform very little function until the extreme outer part of tooth 11 has become worn away. When this occurs the outer edges 14 begin to function. In addition to this auxiliary help in preventing skidding or slipping, all of the teeth are provided with front and rear edges which merge into the outer edges so that when the various teeth or lugs are worn down there will still remain front and rear sharp edges which with the worn down part form more or less sharp corners. These sharp corners and the sharp edges act to prevent slipping. It is well known that when a horse's foot begins to slip, he will tilt the same more or less and, consequently, these sharp edges will come quickly into functioning position. In addition, by this arrangement there are provided three points of contact, namely, a point of contact for each tooth. In forming the various teeth they are preferably proportioned so that the side teeth are about half the thickness and height of the central tooth, and so that the side teeth are smaller than the central tooth. In addition, the side teeth are each formed of a length equal to the thickness of the central tooth.

In the foregoing description I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope thereof.

I claim:—

1. A calk for horseshoes comprising a base, a centrally positioned tooth of a certain size, a pair of side teeth of about half the thickness of the centrally positioned tooth and about half the height, said central tooth extending from one side to the other of said base, while the remaining teeth are appreciably shorter than the first mentioned tooth, all of said teeth having front and rear and bottom sharpened edges.

2. A horseshoe calk including a substantially flat base formed on the lower surface with a centrally positioned tooth extending from one side of the base to the other, said tooth tapering from the base to the bottom of the tooth and being formed with a sharpened lower edge merging into end edges, and an auxiliary tooth on each side of the first mentioned tooth, each of the auxiliary teeth being of a length equal to the thickness of the first mentioned tooth and of about half the height of the first mentioned tooth, said auxiliary teeth being formed with sharpened front and rear edges merging into sharpened lower edges.

3. A horseshoe calk adapted to be placed in position on a horseshoe after the horseshoe is in place on a horse's foot including a substantially flat base adapted to fit flatwise against the lower surface of said horseshoe having a pair of upstanding flanges projecting from one face near opposite edges and extending across the front and rear edges of said horseshoe, and on the opposite face provided with a centrally positioned tooth extending from one side of the base to the other and transversely of said horseshoe, and a pair of auxiliary teeth parallel to said centrally positioned tooth, said auxiliary teeth being of appreciably less thickness and height than the first mentioned tooth, said auxiliary teeth being spaced from the first mentioned tooth and also spaced from the side edges of the base said base having openings in alignment with the nail openings of said horseshoe for the reception of nails.

GEORGE SMITH.